US006615027B1

(12) United States Patent
Sahota et al.

(10) Patent No.: US 6,615,027 B1
(45) Date of Patent: Sep. 2, 2003

(54) METHOD AND CIRCUIT FOR PROVIDING INTERFACE SIGNALS BETWEEN INTEGRATED CIRCUITS

(75) Inventors: Gurkanwal Sahota, San Diego, CA (US); Mehdi H. Sani, San Diego, CA (US); Sassan Shahrokhinia, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/489,231

(22) Filed: Jan. 21, 2000

(51) Int. Cl.[7] ................................................ H04B 1/02

(52) U.S. Cl. .......................... 455/91; 455/93; 341/126; 341/135; 341/144

(58) Field of Search ............................ 455/91, 93, 95, 455/575; 379/399.01; 341/154, 155, 144, 135, 126

(56) References Cited

U.S. PATENT DOCUMENTS

| | | | | |
|---|---|---|---|---|
| 4,573,153 A | | 2/1986 | Nakamura et al. | 371/22 |
| 4,894,864 A | | 1/1990 | Cook | 379/398 |
| 5,030,924 A | | 7/1991 | Fritz | |
| 5,200,655 A | | 4/1993 | Feldt | |
| 5,274,702 A | * | 12/1993 | Rosch et al. | 379/399.01 |
| 5,371,500 A | * | 12/1994 | Lippmann et al. | 341/155 |
| 5,880,631 A | | 3/1999 | Sahota | |

FOREIGN PATENT DOCUMENTS

| | | | |
|---|---|---|---|
| EP | 0587207 | 3/1994 | H03M/1/00 |

OTHER PUBLICATIONS

Digital Meet Analog, Chapter 9, pp. 612–621.

* cited by examiner

*Primary Examiner*—Quochien Vuong
(74) *Attorney, Agent, or Firm*—Philip R. Wadsworth; Charles D. Brown; George C. Pappas

(57) ABSTRACT

Circuitry that generates an interface signal between a first and a second integrated circuit (IC). The circuitry includes a reference circuit that provides a reference signal, an interface circuit, and a circuit element. The interface circuit is implemented on the first IC, operatively couples to the reference circuit, receives the reference signal and a data input, and generates the interface signal. The circuit element is implemented on the second IC, operatively couples to the control circuit, receives the interface signal, and provides an output signal. The reference signal can be a voltage or a current signal, and can be generated in the first or second IC. The interface circuit can be implemented with a current mirror coupled to a switch array, and can be oversampled to ease the filtering requirement. The interface signal can be a differential current signal having multiple (e.g., four, eight, or more) bits of resolution. The circuit element can be, for example, a VGA, a modulator, or other circuits.

85 Claims, 6 Drawing Sheets

METHOD AND CIRCUIT FOR PROVIDING INTERFACE SIGNALS BETWEEN INTEGRATED CIRCUITS

BACKGROUND OF THE INVENTION

I. Field of the Invention

The present invention relates to electronics circuits. More particularly, the present invention relates to novel and improved method and circuit for providing interface signals between integrated circuits.

II. Description of the Related Art

Many electronics systems are implemented using multiple integrated circuits (ICs) that interface together to provide the required system functionality. In many instances, circuit interfaces are provided by digital signals having two logic levels (e.g., high and low) to express digital values. Digital signals are popular for interface because of their ease of implementation and robust immunity to noise.

Special challenges arise when interfacing a digital IC with an analog IC. Digital ICs are more efficient and cost effective for implementing digital functions such as digital signal processing and the like. Analog ICs are used to provide linear functions such as signal amplification, buffering, filtering, modulation, mixing, and so on. In many designs, the interface between the digital and analog ICs is implemented using digital signals. Within the analog IC, the digital signals are buffered, converted to analog signal(s) if necessary, and provided to the analog circuit(s).

The use of digital signals to interface digital and analog ICs is undesirable in some applications for several reasons. First, digital signals typically have large signal swing and sharp transition edges, thereby generating large switching noise. This noise can degrade the performance of the analog circuits, which typically operate on smaller signal swing. The amount of noise can be reduced, to an extent, by using separate power supplies and circuit grounds for analog and digital circuits within the analog IC. However, the reduction may not be adequate for some applications. Second, because each digital signal typically provides one bit of data, multiple (e.g., eight) digital signals are necessary to concurrently provide multiple (e.g., eight) bits of data. In addition, one or more clock signals [may also be] are typically provided to latch the data bits at the receiving IC. A large number of signal lines, and a corresponding number of device pins, may thus be required to interface the ICs. Moreover, switching noise typically increases with more digital signal lines.

Accordingly, techniques for providing an improved interface between ICs using fewer signal lines that generate a reduced amount of noise are highly desirable. It is also desirable that the interface does not require complex circuitry to implement.

SUMMARY OF THE INVENTION

The present invention provides techniques to interface a digital IC and an analog IC. In accordance with one aspect of the invention, one or more interface circuits implemented on the digital IC receive data inputs and, in response, provide interface signals that are provided to the analog IC. For some interfaces (e.g., baseband signals), differential current signals having multiple bits of resolution are used. These signals require fewer signal lines to implement and generate a reduced amount of noise, as compared to digital signals. A reference signal can be provided for use in generating the interface signals.

An embodiment of the invention provides circuitry to generate an interface signal between a first and a second integrated circuit. The circuitry includes a reference circuit, an interface circuit, and a circuit element. The reference circuit provides a reference signal. The interface circuit is implemented on the first integrated circuit, operatively couples to the reference circuit, receives the reference signal and a data input, and generates the interface signal. The circuit element is implemented on the second integrated circuit, operatively couples to the control circuit, receives the interface signal, and provides an output signal.

In an embodiment, the interface circuit includes a current mirror coupled to a switch array. The current mirror receives the reference signal and includes two or more mirror paths. The switch array receives and decodes the data input and directs current from a selected set of mirror paths to an output of the switch array.

The reference signal can be a voltage signal or a current signal (i.e., generated based on a voltage reference), and can be generated with a reference circuit implemented on the first or (preferably for some applications) the second integrated circuit. In an embodiment, the interface signal is a differential current signal having multiple (e.g., four, eight, or more) bits of resolution and filtered with a RC network. The interface circuit may be oversampled to ease the filtering requirement. In an exemplary embodiment, the interface signal represents an inphase (I) or a quadrature (Q) baseband signal in a quadrature transmitter, or a control signal. The circuit element can be, for example, a VGA, a modulator, or other circuits.

Another embodiment of the invention provides circuitry in a transmitter that include a first interface circuit (and for some embodiments, a second interface circuit) operatively coupled to a modulator. The first (and second) interface circuit is implemented on a first integrated circuit, receives a first (or second) data input, and provides a first (or second) differential current signal. The modulator is implemented on a second integrated circuit, receives the first (and second) differential current signal and a carrier signal, and generates an output signal in response. Each data input represents a digital baseband signal and can have four, eight, or more bits of resolution. A reference circuit may be implemented on the second (or possibly first) integrated circuit to provide a reference signal. The interface circuits generate the differential current signals based, in part, on the reference signal.

Yet another.embodiment of the invention provides a transmitter in a (e.g., CDMA) cellular telephone that includes a digital processor, first and second interface circuits, and a modulator. The digital processor is implemented on a first integrated circuit and provides the digital inphase (I) and quadrature (Q) baseband signals. The first and second interface circuits are implemented on the first integrated circuit and couple to the digital processor. Each interface circuit receives a respective digital baseband signal and provides an analog baseband signal. Each analog baseband signal has at least four bits of resolution and is implemented as a differential current signal. The modulator is implemented on a second integrated circuit, operatively couples to the first and second interface circuits, and receives and modulates the analog baseband signals with a carrier signal to provide a modulated output signal. The transmitter can also include a reference circuit that provides a reference signal. The interface circuits then receive the reference signal and generate the analog baseband signals based, in part, on the reference signal.

Yet another embodiment of the invention provides a method for providing an interface signal from a first to a second integrated circuit. In accordance with the method, a reference signal is generated at either the first or second integrated circuit and provided to the first integrated circuit. A data input is also received in the first integrated circuit and is used in conjunction with the reference signal to generate the interface signal. The interface signal is then provided from the first to the second integrated circuit. A circuit element in the second integrated circuit receives the interface signal and generates an output signal in response. The circuit element can also receive a signal related to the reference signal, and can generate the output signal based, in part, on this received signal.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

The invention can be implemented in various electronics circuits and systems. For clarity, the invention is described for a specific implementation in a transmitter of a cellular communications system.

Figure 1:
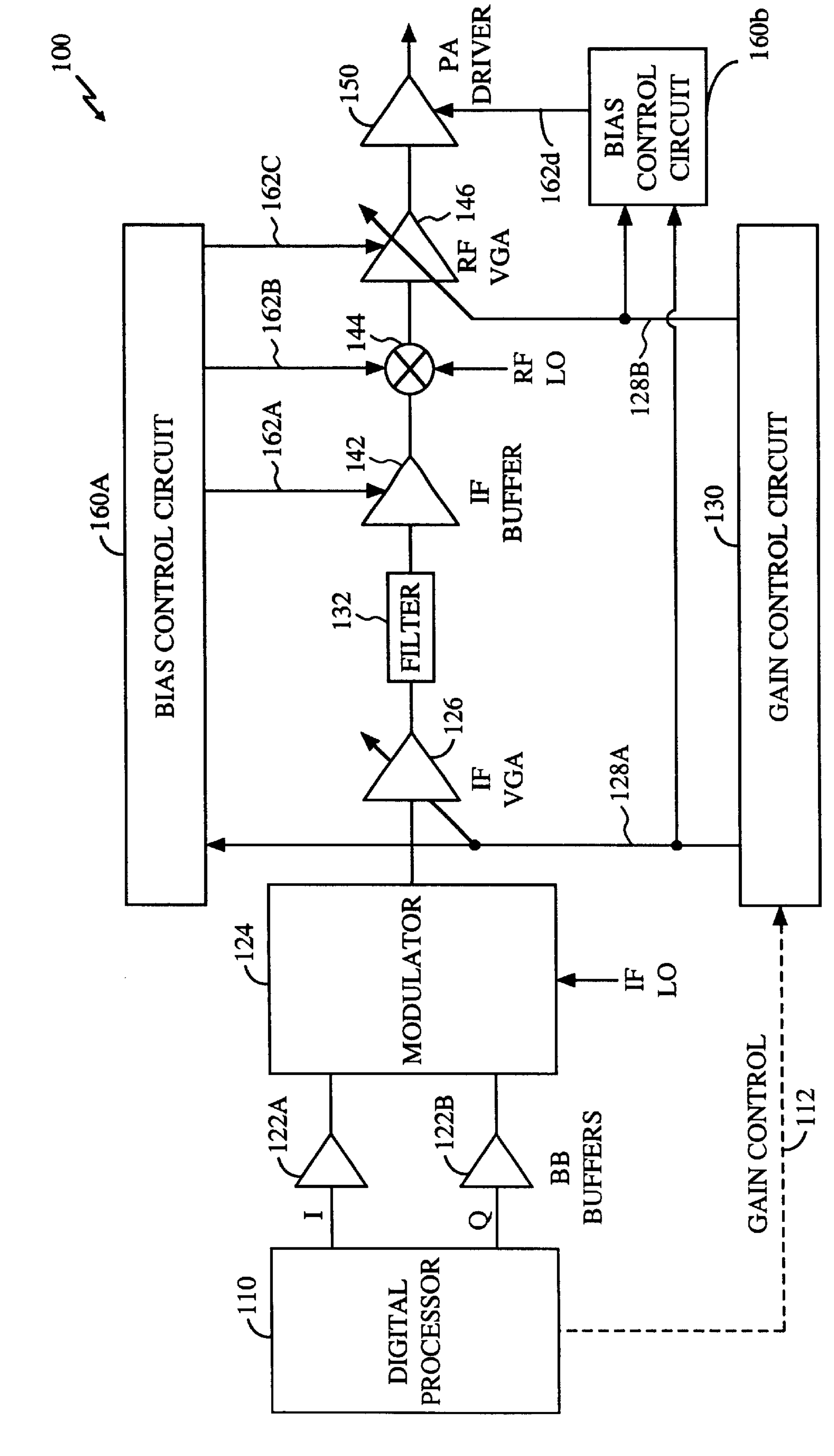
FIG. 1 shows a simplified block diagram of an embodiment of a quadrature transmitter.

FIG. 1 shows a simplified block diagram of an embodiment of a quadrature transmitter 100. A digital processor 110 generates data, encodes the data, and converts the digitally processed data into inphase (I) and quadrature (Q) baseband signals. The baseband signals are provided to baseband (BB) buffers 122*a* and 122*b* that buffer the signals and provide the buffered signals to a modulator 124. Modulator 124 also receives a signal (e.g., a carrier sinusoid) at an intermediate frequency (IF LO), and modulates the buffered baseband signals with the IF LO to generate an IF modulated signal. Modulator 124 can be a single sideband or a double sideband modulator. For a single sideband modulator, one or more phase shifters may be used to generate IF LOs having the proper phases. The IF signal is provided to an IF variable gain amplifier (IF VGA) 126 that amplifies the signal with a gain determined by a gain control signal 128*a* from a gain control circuit 130. The amplified IF signal is provided to a filter 132 that filters the IF signal to remove out-of-band noise and undesired signals.

The filtered IF signal is provided to an IF buffer 142 that buffers the signal and provides the buffered IF signal to a mixer 144. Mixer 144 also receives a signal (e.g., a carrier sinusoid) at a radio frequency (RF LO), and upconverts the buffered IF signal with the RF LO to generate a RF signal. Mixer 144 can also be a single sideband or double sideband mixer. The single sideband mixer embodiment may have phase shifters in both the IF and RF LO paths. The RF signal is provided to a RF VGA 146 that amplifies the signal with a gain determined by a gain control signal 128*b* from gain control circuit 130. The amplified RF signal is provided to a power amplifier (PA) driver 150 that further interfaces with other circuitry such as an external filter (i.e., for filtering out images and spurious signals) and a power amplifier (both elements not shown in FIG. 1). The PA driver provides the required signal drive, and its output couples to an antenna via an isolator and a duplexer (these elements are not shown in FIG. 1).

Various modifications can be made to the transmitter embodiment shown in FIG. 1. For example, fewer or additional filter, buffer, and amplifier stages can be provided in the transmit signal path. Some of the components shown in FIG. may not be used in some embodiments. Moreover, the elements within the signal path can be arranged in different order. In addition, the variable gain in the transmit signal path can be provided by VGAs (as shown in FIG. 1), variable attenuators, multipliers, other variable gain elements, or a combination of the above. Also, a direct upconversion can be used in which the baseband signals are directly upconverted to RF.

Transmitter 100 can be used in many communications applications, such as cellular communications systems. Examples of cellular communications systems include Code Division Multiple Access (CDMA) communications systems, Time Division Multiple Access (TDMA) communications systems, and analog FM communications systems. The use of CDMA techniques in a multiple access communications system is disclosed in U.S. Pat. No. 4,901,307, entitled "Spread Spectrum Multiple Access Communication System Using Satellite or Terrestrial Repeaters," and U.S. Pat. No. 5,103,459, entitled "System and Method for Generating Waveforms in a CDMA Cellular Telephone System," both patents assigned to the assignee of the present invention and incorporated herein by reference. CDMA systems are typically designed to conform to the "TIA/EIA/IS-95-A Mobile Station-Base Station Compatibility Standard for Dual-Mode Wideband Spread Spectrum Cellular System," hereinafter referred to as the IS-95-A standard, which is also incorporated herein by reference.

As shown in FIG. 1, the bias currents for some of the elements in the transmit signal path can be adjusted based on the gain control signals generated by gain control circuit 130. For example, the bias currents of IF buffer 142, mixer 144, and RF VGA 146 can each be adjusted by a bias control circuit 160*a* via bias control signals 162*a*, 162*b*, and 162*c*, respectively, which are generated based on the value of gain control signal 128*a*. Similarly, the bias current of PA driver 150 can be adjusted by a bias control circuit 160*b* via a bias control signal 162*d* that is generated based on gain control signal 128*a* or 128*b*, or both. Gain control signals 128*a* and 128*b* may be generated based on a gain control signal 112 that may come from digital processor 110 (as shown by the dashed line in FIG. 1) or another control source.

In an embodiment, the transmit signal path from BB buffers 122 to PA driver 150 (possibly excluding filter 132 ) is implemented within one or more (e.g., analog) integrated circuits. In an embodiment, the digital processor is implemented on another (e.g., digital) integrated circuit. The gain and bias control circuits can be implemented on the same integrated circuit as the digital processor, on the integrated circuit(s) used to implement the transmit signal path, or on a separate integrated circuit. Thus, interface signals are provided for the baseband signals from the digital processor and the (e.g., gain and bias) control signals from the control circuits.

In FIG. 1, the I and Q baseband signals may each comprise multiple bits of resolution. This can result from, for example, filtering a two-level digital signal with a digital filter. Thus, multiple signal lines may be required to interface the digital processor to the analog circuitry.

In one conventional design, each of the I and Q baseband signals has eight bits of resolution, and the interface comprises eight data lines and two clocks lines. The data lines are time shared between the I and Q signals. The clock lines provide two clock signals that are (e.g., 180 degrees) out-of-phase with respect to each other. The data lines are used to provide the I signal on one phase of the clock and the Q signal on the other phase of the clock. In this design, the data and clock lines generate noise that can degrade the performance of the analog circuits in the transmit signal path. Moreover, the (ten) data and clock lines require a corresponding number of (ten) device pins on both the digital and analog ICs.

Figure 2:
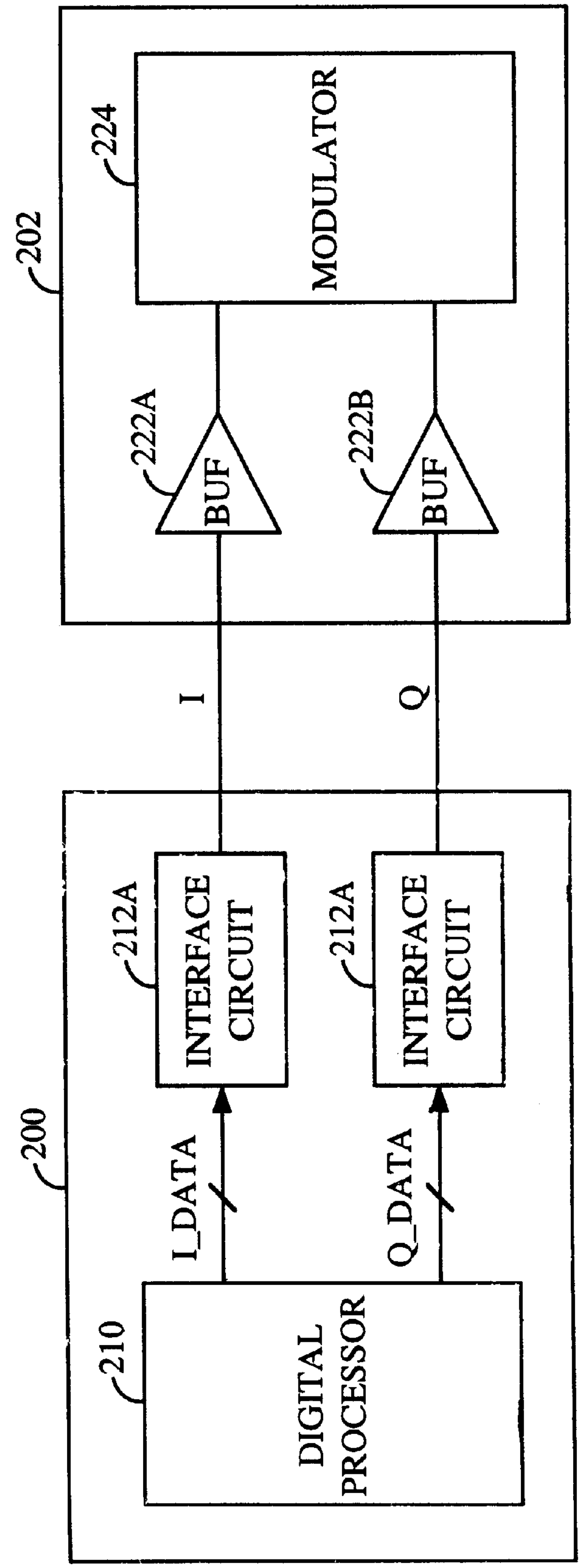
FIG. 2 shows a block diagram of an embodiment of an interface between a digital IC and an analog IC for the I and Q baseband signals.

FIG. 2 shows a block diagram of an embodiment of an interface between a digital IC 200 and an analog IC 202 for the I and Q baseband signals. As shown in FIG. 2, a digital processor 210 within IC 200 provides the I and Q data to interface circuits 212*a* and 212*b*, respectively. In an embodiment, each of the I and Q data comprises multiple bits of data. Each interface circuit 212 receives the respective data input, converts the data to an analog baseband signal, and provides the analog baseband signal to IC 202. Within IC 202, the I and Q baseband signals are provided to buffers 222*a* and 222*b*, respectively, and the buffered signals are provided to a modulator 224.

Figure 3:
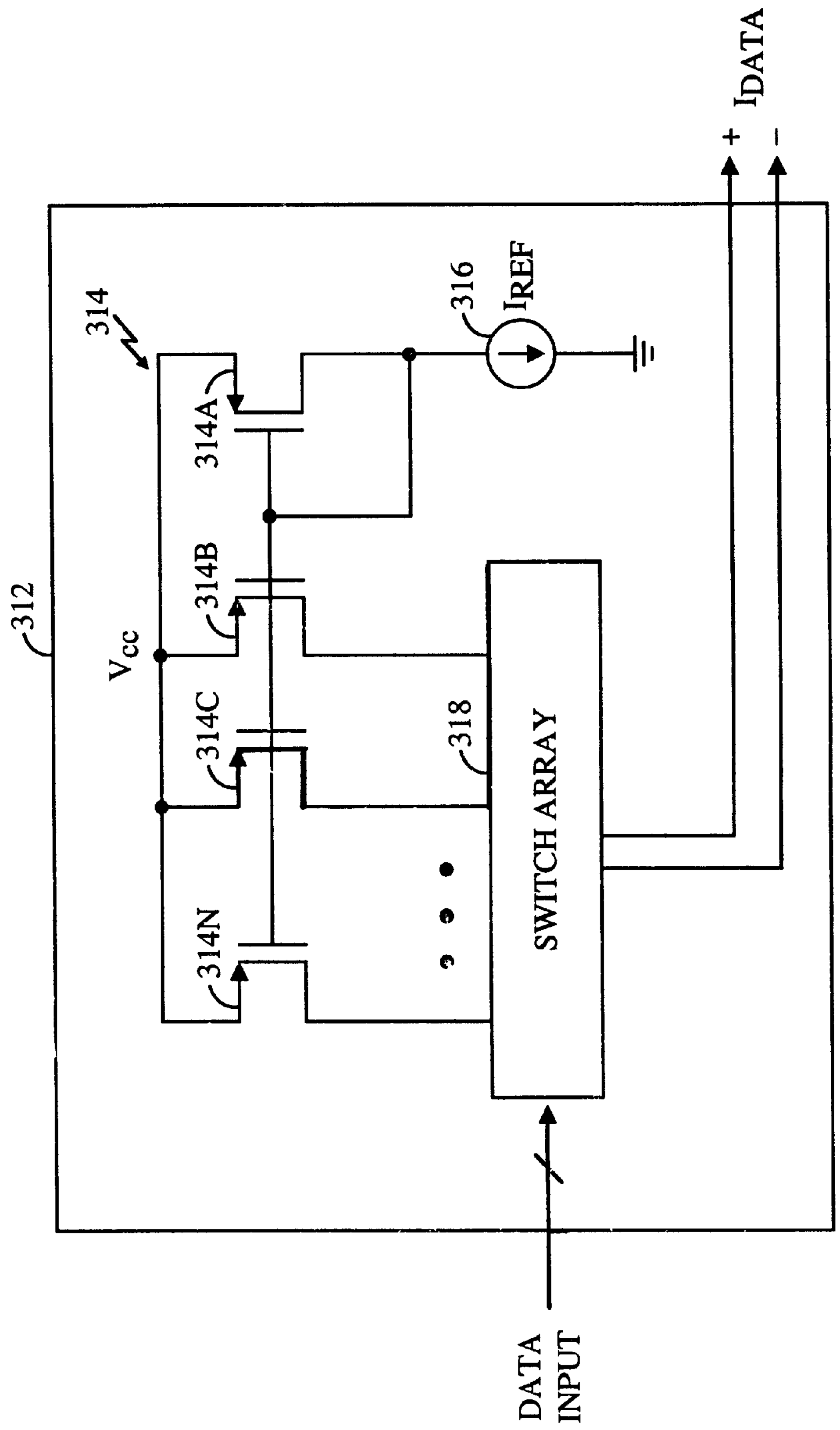
FIG. 3 shows a schematic diagram of an embodiment of an interface circuit.

FIG. 3 shows a schematic diagram of an embodiment of an interface circuit 312. One interface circuit 312 can be used to implement each of interface circuits 212*a* and 212*b* in FIG. 2. In this embodiment, interface circuit 312 includes a set of P-channel transistors 314*a* through 314*n* configured as a current mirror 314. The gates of transistors 314*a* through 314*n* couple together and the sources also couple together and to a power supply $V_{CC}$. The drain of transistor 314*a* couples to the gate of transistor 314*a* and to a current source 316 that provides a reference current $I_{REF}$. Each of transistors 314*b* through 314*n* is configured to provide a particular "mirror" current that is proportional to the reference current $I_{REF}$. The proportionality (or scaling) factor for a particular mirror path is dependent on the ratio of the size of the transistor in that path to the size of transistor 314*a*. For example, if transistor 314*b* is twice the size of transistor 314*a*, then the amount of current through transistor 314*b* is approximately twice the reference current $I_{REF}$.

A switch array 318 couples to transistors 314*b* through 314*n*. Switch array 318 also receives and decodes the data input and activates a set of switches within the array that selectively steer the current from transistors 314*b* through 314*n* to the output of the array. The data input can be the I data or the Q data shown in FIG. 2. In an embodiment, switch array 318 includes circuitry that generates a differential current signal $I_{DATA}$ as the output of interface circuit 312.

The use of interface circuits 312 to provide the I and Q baseband signals to the analog IC provides many advantages. Some of these advantages are described below.

First, only two sets of different signal lines (i.e., four lines in all) are required to provide the differential current signals for the I and Q baseband signals. In contrast, eight digital data lines and two clock lines are required by one conventional design. Fewer number of signal lines reduces the number of device pins required to interface the ICs.

Second, the differential current signal $I_{DATA}$ generally has low impedance and limited (or reduced) signal swing. In contrast, the digital signals of the aforementioned conventional design have large signal swing and sharp transition edges. The differential current signals thus generate much less noise than the digital signals.

Third, the differential current signals can reduce circuit complexity at the source and destination ICs. For improved performance (e.g., wide bandwidth, linearity, and so on) many high-speed analog circuits are designed to operate on different current signals. By providing a differential current signal to the analog IC (i.e., as opposed to voltage signals or digital signals), buffering and voltage-to-current conversion circuitry may not be required within the analog IC, thus simplifying its design.

For a CDMA system that conforms to IS-95-A specifications, each of the I and Q data has a bit rate of 1.2288 Mbps. In an embodiment, the I and Q data are oversampled and filtered (e.g., within the digital processor) to provide filtered I and Q data, respectively. It is known that generation of an analog signal from sampled data produces images at the sample rate. By oversampling the I and Q data (e.g., by a factor of 16 ), the images are pushed higher in frequency by the oversampling factor (which is 16 in this example) and the filtering of the images is simplified. With oversampling, the images can be filtered by a simple RC network, as described below.

For many integrated circuits, variations in the manufacturing process make it difficult to generate accurate component values (e.g., accurate resistor and capacitor values). However, component matching is typically quite good since the entire IC typically experiences similar process conditions. Thus, while it may be challenging to fabricate a resistor having a value that is accurate to within ±30 percent of a targeted value, it is often feasible to match two resistors to within a few percent.

Even with the manufacturing process variations, circuits within the analog IC are required to perform to specifications. To provide consistent performance from IC to IC, the circuits can be designed to operate in conjunction with a reference signal (or a reference value) that can be accurately generated on the IC. For electronic circuits, a bandgap reference circuit can be designed to provide a (relatively) accurate reference voltage (even over process variations). Moreover, the bandgap reference voltage is typically stable over time, power supply, and temperature variations. The bandgap reference voltage can be used to generate other reference voltages and currents used by various circuits within the IC.

Figure 4:
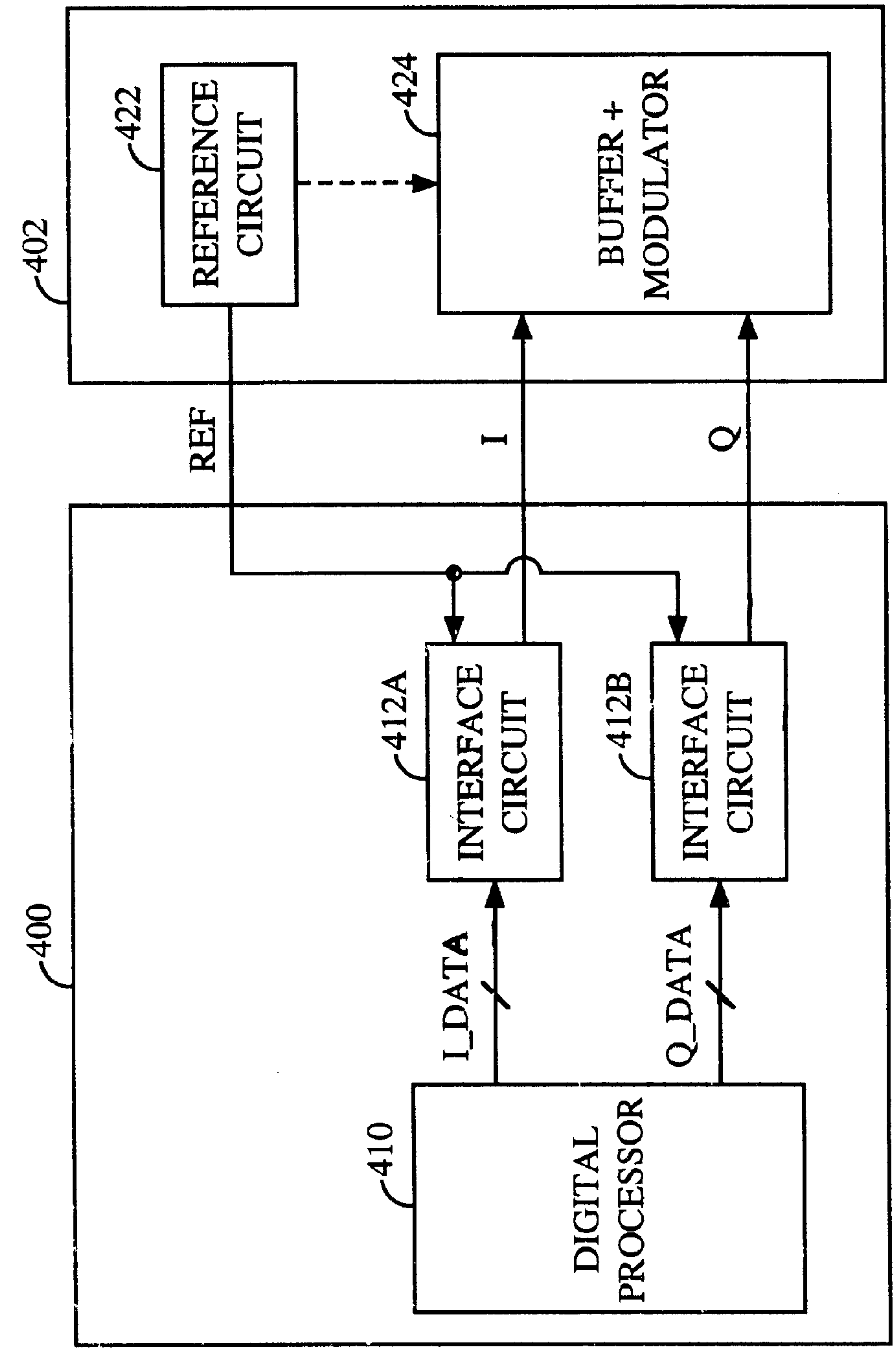
FIG. 4 shows a block diagram of an other embodiment of an interface between a digital IC and an analog IC for the I and Q baseband signals.

FIG. 4 shows a block diagram of another embodiment of an interface between a digital IC 400 and an analog IC 402 for the I and Q baseband signals. As shown in FIG. 4, a digital processor 410 within IC 400 provides the I and Q data to interface circuits 412*a* and 412*b*, respectively. Each interface circuit 412 receives the respective data input and a reference signal REF from a reference circuit 422 within IC 402, converts the data to an analog signal (i.e., using, in part, the reference signal REF), and provides the analog signal to a buffer and modulator 424 within IC 402. A replica of, or a signal related to, the reference signal REF can also be provided from reference circuit 422 to buffer and modulator 424, as indicated by the dashed line.

The reference signal REF can generally be a reference voltage (e.g., a bandgap reference voltage) or a reference current. By operating the interface circuit and the modulator based on a common reference signal, these circuits can be designed to track each other over process variations on their respective ICs, as described below.

Figure 5:
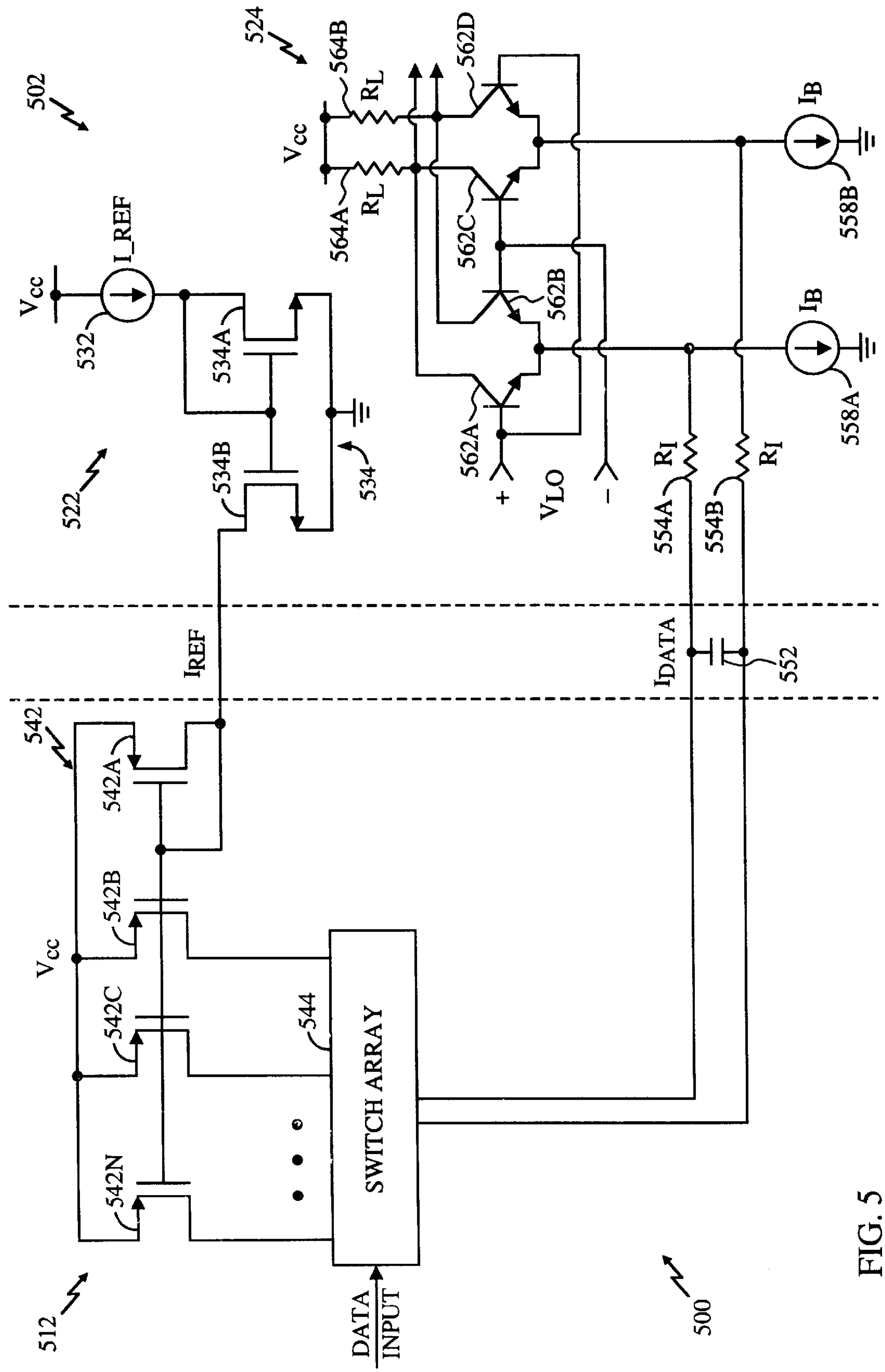
FIG. 5 shows a schematic diagram of a specific embodiment of the interface and circuitry shown in FIG. 4.

FIG. 5 shows a schematic diagram of a specific embodiment of the interface and circuitry shown in FIG. 4. As shown in FIG. 5, a digital IC 500 includes an interface circuit 512 that couples to a reference circuit 522 and a modulator 524 within an analog IC 502. Reference circuit 522, interface circuit 512, and modulator 524 correspond to reference circuit 422, interface circuit 412, and modulator 424, respectively, in FIG. 4.

In an embodiment, reference circuit 522 includes a current source 532 coupled to a current mirror 534. In an embodiment, current source 532 provides a reference current I_REF generated by providing a bandgap reference voltage across a resistor. The resistor can be an external (i.e., discrete) resistor or an internal resistor fabricated on IC 502, with the choice being dependent on the desired circuit characteristics and functionality, as described below. The reference current I_REF is provided to the reference path (i.e., via a N-channel transistor 534*a*) of current mirror 534. The current through the mirror path (i.e., via a N-channel transistor 534*b*) comprises the reference current $I_{REF}$ that is provided to IC 500. Generally, $I_{REF}$ is proportional to I_REF, with the proportionality factor being determined by the ratio of the size of transistor 534*b* to the size of transistor 534*a*.

Within IC 500, the reference current $I_{REF}$ is provided to interface circuit 512. In an embodiment, interface circuit 512 comprises a current mirror 542 coupled to a switch array 544. Specifically, the reference current $I_{REF}$ is provided to a reference path (i.e., via a P-channel transistor 542*a*) of current mirror 542. Since the gate-source voltage of transistors 542*a* through 542*n* are approximately equal, the current through each mirrored path (i.e., via transistors 542*b* through 542*n*) is related to the current $I_{REF}$ through the reference path (i.e., via transistor 542*a*). The proportionality factor is determined by the ratio of the size of the transistor in the particular mirror path to the size of transistor 542*a*. Transistors 542*b* through 542*n* can be dimensioned to provide approximately equal current through each mirror path (e.g., 1, 1, 1, and so on), exponentially increasing currents (e.g., 1, 2, 4, and so on), or other sets of current values.

Switch array 544 couples to transistors 542*b* through 542*n* and also receives the data input. Switch array 544 decodes the data input and, based on the decoded data, selectively steers current from the mirror paths to the output of the switch array. The current signal $I_{DATA}$ from switch array 544 is provided to IC 502. In an embodiment and as shown in FIG. 5, the current output is provided as a differential current signal for improved noise immunity.

Interface circuit 512 performs in similar manner as a digital-to-analog converter (DAC). Thus, the reconstructed output from interface circuit 512 includes images at $n \cdot f_s$, where $f_s$ is the sample frequency (i.e., the rate of the data input) and n=1, 2, 3, . . . . Interface circuit 512 can be oversampled (e.g., by a factor of 2, 4, 8, 16, or other oversampling ratios) to push the images in the reconstructed signal to higher frequencies for ease of filtering.

As shown in FIG. 5, the current signal $I_{DATA}$ is filtered by a RC network to remove undesired noise and images normally associated with an output from a digital to analog conversion. Specifically, a capacitor 552 is coupled between the differential current signal I that further couples to one end of resistors 554*a* and 554*b*. Capacitor 552 and resistors 554 can be external (i.e., discrete) components or internal components implemented within the ICs (i.e., IC 500 or 502, or both). In an embodiment, capacitor 552 is an external component (i.e., having a value that is larger than that which can be practically implemented within an IC) and resistors 554 are internal components implemented within IC 502.

The other ends of resistors 554*a* and 554*b* couple to current sources 558*a* and 558*b*, respectively, of modulator 524. In an embodiment, each current source 558 provides a bias current $I_B$that is related to the reference current I_REF, as described below. Modulator 524 further includes a pair of differential amplifiers. The first differential amplifier comprises transistors 562*a* and 562*b* having their emitters coupled together and to current source 558*a*. The second differential amplifier comprises transistors 562*c* and 562*d* having their emitters coupled together and to current source 558*b*. The bases of transistors 562*a* and 562*d* couple together and receive a positive carrier signal $V_{LO}$+, and the bases of transistors 562*b* and 562*c* couple together and receive a negative carrier signal $V_{LO}$−. The collectors of transistors 562*a* and 562*c* couple together and to a resistor 564*a* that further couples to the supply voltage $V_{CC}$. The collectors of transistors 562*b* and 562*d* couple together and to a resistor 564*b* that also couples to the supply voltage $V_{CC}$. The differential voltages at resistors 564*a* and 564*b* form the output voltage signal $V_{OUT}$ from modulator 524.

In an embodiment, the reference current I_REF is dependent on a bandgap reference voltage from a bandgap reference circuit (not shown in FIG. 5). In an embodiment, the bandgap voltage reference is provided across an external resistor (i.e., a discrete resistor external to IC 502 ) to generate the reference current I_REF, which can be expressed as:

$$\text{I\_REF} = \frac{V_{REF}}{R_{REF}}, \qquad \text{Eq. (1)}$$

where $V_{REF}$ is the bandgap reference voltage and $R_{REF}$ is the value of the external reference resistor. The use of an external resistor enables the generation of an accurate reference current I_REF, since discrete resistors with 1.0 (or 0.1) percent tolerance are readily available. The reference current $I_{REF}$ is proportional to the reference current I_REF, as determined by the particular design of current mirror 534, and can be expressed as:

$$I_{REF} = \alpha_1 \cdot \text{I\_REF} = \alpha_1 \cdot \frac{V_{REF}}{R_{REF}}, \qquad \text{Eq. (2)}$$

where $\alpha_1$ is the scaling factor associated with current mirror 534.

Interface circuit 512 generates the differential current signal $I_{DATA}$, which is a scaled version of the reference current $I_{REF}$. The scaling factor is determined by the data input and the particular design of current mirror 542 (i.e., the sizes of transistors 542*a* through 542*n*). Specifically, the ratio in sizes of each of transistors 542*b* through 542*n* to transistor 542*a* determines the amount of current to be switched for each current path. The data input determines which ones of the switches within switch array 544 are activated and thus the current path(s) to be directed to the switch array output. The current signal $I_{DATA}$ can theoretically be expressed as:

$$I_{DATA}(t)=\frac{\alpha_1\alpha_2}{2^N}\cdot\frac{V_{REF}}{R_{REF}}\cdot\sum_{n=0}^{\infty}x(n)\cdot h(t-nT)=K\cdot s(t),\tag{3}$$

where x[n] is the value of the data input, h(t) is the zero order hold response of the DAC, N is the number of bits for the data input, $\alpha_2$ is the scaling factor associated with current mirror 542, $$K=\frac{\alpha_1\alpha_2}{2^N}\cdot\frac{V_{REF}}{R_{REF}},\text{ and}\tag{4}$$

$$s(t)=\sum_{n=0}^{\infty}x(n)\cdot h(t-nT).\tag{5}$$

For an eight bit data input, x[n] ranges from 0 to 255 and $2^N$ is equal to 256.

Modulator 524 generates the voltage signal $V_{OUT}$ based on the current signal $I_{DATA}$, the carrier signal $V_{LO}$, the load resistor $R_L$, and a modulator gain or conversion factor β. The voltage signal $V_{OUT}$ can be expressed as:

$$V_{OUT}(t)=\beta\cdot 2R_L\cdot I_{DATA}(t)=\beta\cdot 2R_L\cdot K\cdot s(t).\tag{6}$$

By lumping the constants together, equation (6) can be expressed as:

$$V_{OUT}(t)=A\cdot R_L\cdot s(t).\tag{7}$$

It can be noted from equation (7) that the voltage signal $V_{OUT}$ is a function of the ratio of $R_L$ to $R_{REF}$, the data input x[n], the bandgap voltage reference $V_{REF}$, and a scaling factor A that takes into account various factors. The scaling factor A includes the scaling factors o and o associated with current mirrors 534 and 542, respectively. These scaling factors can be accurately set because they are based on the ratios of the sizes of transistors, which can be matched (typically to within a few percents) by exercising good circuit layout techniques. Typically, the bandgap reference voltage $V_{REF}$ and the external reference resistor $R_{REF}$ can also be accurately set.

As noted above, the value of internal resistor $R_L$ cannot typically be set with a high degree of accuracy, and can vary by 30 percents or more from IC to IC due to process variations. Thus, the voltage signal $V_{OUT}$ can vary widely from IC to IC. However, the voltage signal $V_{OUT}$ is typically converted to a current signal $I_{OUT}$ for use by a subsequent circuit, and the V-to-I conversion is achieved by providing $V_{OUT}$ across another internal resistor $R_1$. The current signal $I_{OUT}$ can be expressed as:

$$I_{OUT}(t)=\frac{V_{out}(t)}{R_1}=A\cdot\frac{R_L}{R_1}\cdot s(t).\tag{8}$$

From equation (8), it can be noted that the current signal $I_{OUT}$, is a function of the ratio of internal resistors $R_L$ to $R_1$, which can typically be set to an accuracy of within one percent by following good circuit layout guidelines.

For implementations in which the voltage signal $V_{OUT}$ is used directly (i.e., without a V-to-I conversion), an accurate $V_{OUT}$ over process variations can be generated by using an internal reference resistor $R_{REF}$. Referring to equation (7), the voltage signal $V_{OUT}$ is dependent on the ratio of resistors $R_L$ to $R_{REF}$, which can be accurately set to within a few percent if both resistors are internally implemented on the same IC.

Thus, the reference resistor $R_{REF}$ can be internal or external, depending on the desired characteristics of the circuit. The voltage signal $V_{OUT}$ or the current signal $I_{OUT}$ can be designed to be dependent mostly on factors that can be accurately set and which is, to a large extent, indifferent to process variations. To generate a voltage signal $V_{OUT}$ that is accurate over process variations an external reference resistor is used, and to generate a current signal $I_{OUT}$ that is accurate over process variations an internal reference resistor is used.

In the specific embodiment of modulator 524 in FIG. 5, current source 558*a* provides the current "sink" for the differential mixer (comprised of transistors 562*a* and 562*b*) and the current signal $I_{DATA}$ via resistor 554*a*. As noted above, the current signal $I_{DATA}$ is related to the reference current $I_{REF}$. If the current signal $I_{DATA}$ increases because of an increase in the reference current $I_{REF}$, then the amount of current through the differential mixer decreases correspondingly if the bias current $I_B$is fixed, resulting in the mixer cutting off on positive $I_{DATA}$ excursions. The performance (e.g., bandwidth, linearity, and so on) of the differential mixer can degrade due to the smaller bias current.

In an embodiment, to reduce performance degradation due to changes in the reference current $I_{REF}$, the bias current $I_B$is designed to be proportional to the reference current $I_{REF}$ (e.g., $I_B \cong 2I_{REF}$, or some other values). This can be achieved through the use of a current mirror, with the reference current $I_{REF}$ being provided to the reference path of the current mirror and the bias current $I_B$being provided from the mirror path.

The specific embodiment shown in FIG. 5 provides many advantages. First, only five signal lines are required to provide interface for the I and Q baseband signals (i.e., four lines for the I and Q signals and one for the reference signal). Thus, fewer number of device pins is required to interface the ICs than for the conventional design that uses ten signal lines. Fewer device pins result in a smaller package, thus reducing the size. Second, the differential current signal $I_{DATA}$ drives a low impedance resulting in reduced signal swings at the interface, thus resulting in less noise being generated by this signal. The low impedance also reduces interference. Third, the differential current signal can reduce circuit complexity in the digital and analog ICs. As shown in FIG. 5, interface circuit 512 (by its nature) generates a current signal that can be provided directly, without a signal conversion, to the analog IC. Modulator 524 receives and can directly operate on the differential current signal. Thus, I-to-V and V-to-I conversion circuits are avoided by providing current interfaces. Fourth, the sharing of the reference signal $I_{REF}$ between the digital and analog ICs allows for tracking between the two ICs. As shown in FIG. 5, the current signal $I_{DATA}$ from interface circuit 512 is dependent on the reference current $I_{REF}$. The bias current $I_B$can also be designed to track the reference current $I_{REF}$, as described above, thus allowing the modulator to track the interface circuit. This interface can also allow the current to be shared between the DAC and the mixer, if $I_{DATA}$ is generated from an (NMOS) current source.

Various modifications can be made to the specific embodiment shown in FIG. 5. For example, reference circuit 522 can be implemented in digital IC 500, in which case the reference signal $I_{REF}$ is provided from IC 500 to IC 502. Implementation of the reference circuit in a digital IC is typically more challenging because of the large amounts of switching noise on the digital IC, although this is feasible and may be advantageous for some applications.

Reference circuit 522 can also be designed as a programmable reference source. For example, current source 532 can comprise a DAC that provides different reference currents depending on the value of a control input. The use of a programmable reference source is particularly advantageous, for example, to allow for adjustment of circuit characteristics (e.g., output signal level, to account for process variations), or to vary the input signal level to provide variable gain.

The invention has been described for the interface of the I and Q baseband signals from the digital IC to the analog IC. The invention can also be used for control signals such as the bias and gain control signals shown in FIG. 1. The bias current and gain of the circuit elements in the transmit signal path are typically controlled, if at all, in increments. For example, the IS-95-A standard requires adjustment of the transmitter output power level in 0.5 dB increments. A multi-level control signal is typically used to provide gain adjustment in 0.5 dB increments, as required by IS-95-A specifications.

As with the baseband signals, a multi-level control signal can be provided by using multiple digital signal lines. However, this is generally not desired because of the large number of required device pins, large amounts of generated noise, and other reasons. An analog control signal generates less noise and can provide multiple levels of control using fewer device pins.

The gain of a gain element (e.g., a VGA) is dependent on various factors such as the design of the gain element, the component values, the characteristics of the active devices, and others. Many of these factors are dependent on the process used to manufacture the IC, and process variations typically cause component values to differ widely. For example, resistor values can vary by 30 percent or more from IC to IC. Similarly, the beta of transistors can vary by a factor of two from one IC to the next. To provide a level of tracking between the control circuit and the element to be controlled, a reference signal can be provided and shared by the circuits.

Figure 6:
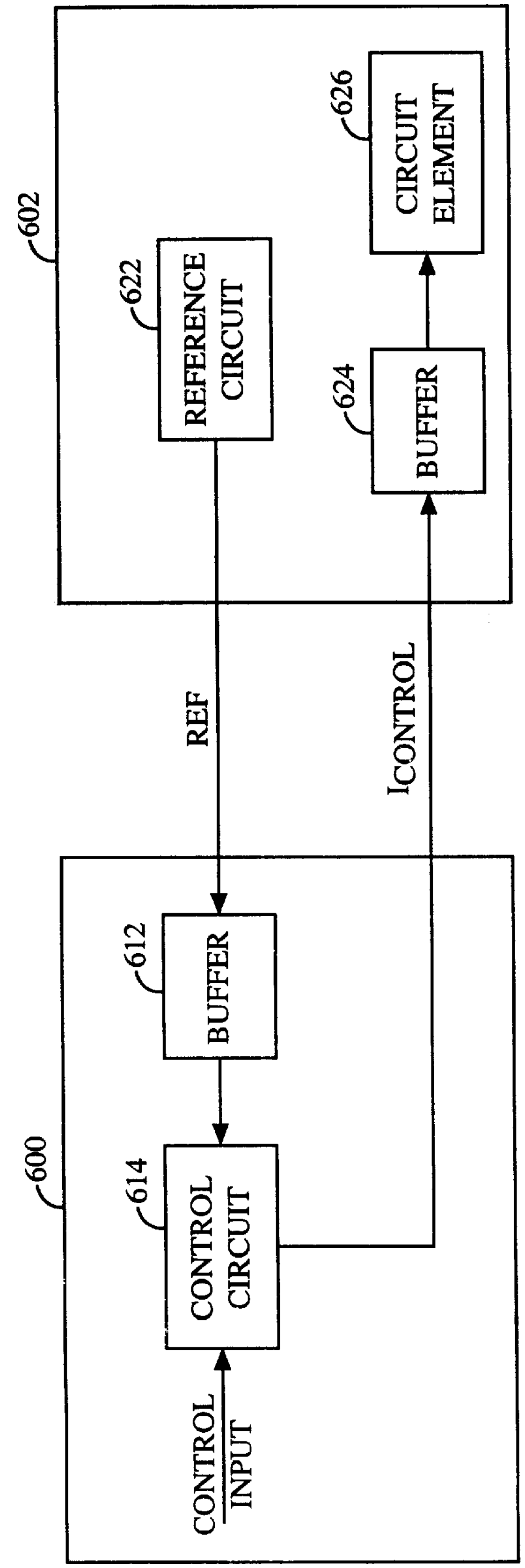
FIG. 6 shows a block diagram of an embodiment of circuits used to generate a control signal in accordance with the invention.

FIG. 6 shows a block diagram of an embodiment of circuits used to generate a control signal in accordance with the invention. The control circuit is implemented on an IC 600 and the circuit element to be controlled is implemented on an IC 602. IC 602 includes a reference circuit 622 that generates a reference signal REF. The reference signal can be a bandgap voltage reference or a reference current based on, for example, a bandgap voltage. The reference signal REF is provided from IC 602 to IC 600.

Within IC 600, the reference signal REF is buffered by a buffer 612 and provided to a control circuit 614. Control circuit 614 also receives a control input and generates a control signal based on the buffered reference signal and the control input. In an embodiment, the control signal is a current signal $I_{CONTROL}$. The control signal is provided from IC 600 to IC 602.

Within IC 602, the control signal is buffered by a buffer 624 and provided to a circuit element 626. Buffer 624 can, if necessary, generate a control voltage from a received current signal by passing the current signal through a resistor. This resistor can be an external resistor or an internal resistor fabricated on IC 602.

In a specific embodiment, reference circuit 622 generates a reference current $I_{REF}$ based on a bandgap reference voltage and a resistor. Interface circuit 614 then generates the control signal $I_{CONTROL}$ that is a scaled version of the reference current. The scaling is determined, in part, by the control input., The control current signal can be expressed as:

$$I_{CONTROL}=K \cdot I_{REF} \cdot y[n], \qquad \text{Eq. (9)}$$

wherein y[n] is the control input and K is the overall scaling factor that takes into account the scaling factors for the reference and control circuits (e.g., the current mirrors within the reference and control circuits). The control current signal is buffered by buffer 624, and the buffered signal is provided to circuit element 626. Circuit element 626 can be, for example, a VGA, a mixer, a PA driver, or other circuit elements.

FIG. 6 shows a specific embodiment for the interface of a control signal between ICs. The invention can be applied to the generation of control signals for cellular telephone transmitter and receivers, and for other circuits. For example, analog control signals can be generated in accordance with the present invention to control, for example, attenuators, mixers, power amplifiers, oscillators in phase lock loops, adjustable filters, and other circuits. The invention is particular advantageous when the circuit to be controlled is fabricated on a first integrated circuit having a first set of characteristics and the control circuit is fabricated on a second integrated circuit having a second set of characteristics that can vary independently with respect to those of the first integrated circuit.

Some embodiments of the invention have been described with circuitry implemented using BJTs and MOSFETs. The invention can also be implemented with other circuits including FETs, MESFETs, HBTs, P-HEMTs, and others. Also, P-MOS and N-MOS can be used to implement the invention. As used herein, "transistor" generically refers to any active circuit, and is not limited to a BJT or MOSFET.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. Circuitry to generate an interface signal between a first integrated circuit and a second integrated circuit comprising:

a reference circuit configured to provide a reference signal;

an interface circuit implemented on the first integrated circuit and operatively coupled to the reference circuit, the interface circuit configured to receive the reference signal and a data input and to generate the interface signal in response thereto; and a circuit element implemented on the second integrated circuit and operatively coupled to the interface circuit, the circuit element configured to receive the interface signal and provide an output signal in response, wherein the interface signal is a differential current signal.

2. The circuitry of claim 1, wherein the reference circuit is implemented on the second integrated circuit.

3. The circuitry of claim 1, further comprising:

at least one capacitor coupled between the differential current signal.

4. The circuitry of claim 1, wherein the interface signal represents an analog inphase (I) or quadrature (Q) baseband signal in a quadrature transmitter.

5. The circuitry of claim 1, wherein the reference signal is a voltage related to a bandgap voltage.

6. The circuitry of claim 1, wherein the reference signal is a current generated from a reference voltage and a resistor.

7. The circuitry of claim 6, wherein the output signal is a voltage signal, and wherein the resistor is external to the first and second integrated circuits.

8. The circuitry of claim 6, wherein the output signal is a current signal, and wherein the resistor is implemented on the second integrated circuit.

9. The circuitry of claim 6, wherein the interface circuit includes a current mirror configured to receive the reference signal and to provide two or more mirror paths, and a switch array coupled to the current mirror, the switching array configured to receive and decode the data input and to direct current from a set of selected mirror paths to an output of the switch array.

10. The circuitry of claim 1, wherein the data input comprises at least four bits of resolution.

11. The circuitry of claim 10, wherein the data input comprises at least eight bits of resolution.

12. The circuitry of claim 1, wherein the interface circuit is oversampled by an oversampling ratio of two or greater.

13. The circuitry of claim 12, wherein the oversampling ratio is 16 or greater.

14. The circuitry of claim 1, wherein the circuit element is a variable gain amplifier (VGA).

15. The circuitry of claim 1, wherein the circuit element is a modulator.

16. The circuitry of claim 15, wherein the modulator includes a pair of current sources coupled to the interface signal, and a pair of cross-coupled differential amplifiers, each differential amplifier coupled to a respective current source, the differential amplifiers configured to receive a carrier signal and to generate the output signal based, in part, on the carrier signal and the interface signal.

17. The circuitry of claim 16, wherein each current source in the modulator provides a bias current that is related to the reference signal.

18. A transmitter comprising the circuitry of claim 1.

19. A transmitter in a CDMA cellular telephone comprising the circuitry of claim 1.

20. Circuitry in a transmitter comprising:

a first interface circuit implemented on a first integrated circuit, the first interface circuit configured to receive a first data input and provide a first differential current signal; and a modulator implemented on a second integrated circuit and operatively coupled to the first interface circuit, the modulator configured to receive the first differential current signal and a carrier signal and to generate an output signal in response thereto.

21. The circuitry of claim 20, further comprising:

a second interface circuit implemented on the first integrated circuit, the second interface circuit configured to receive a second data input and provide a second differential current signal, wherein the modulator is further configured to receive the second differential current signal and to generate the output signal in response to the second differential current signal.

22. The circuitry of claim 21, wherein the first and second data inputs correspond to inphase (I) and quadrature (Q) baseband signals in a quadrature transmitter.

23. The circuitry of claim 21, further comprising:

a capacitor coupled between each of the first and second differential current signals.

24. The circuitry of claim 21, wherein each of the first and second data inputs has eight or more bits of resolution.

25. The circuitry of claim 21, wherein the first and second interface circuits are operated at an oversampled rate relative to a rate of the first and second data inputs.

26. The circuitry of claim 25, wherein the oversampled rate is sixteen or greater.

27. The circuitry of claim 20, further comprising:

a reference circuit implemented on the second integrated circuit and configured to provide a reference signal, wherein the first interface circuit couples to the reference circuit and is further configured to receive the reference signal and to generate the first differential current signal based, in part, on the reference signal.

28. The circuitry of claim 27, wherein the reference signal is a current generated based on a reference voltage.

29. A transmitter in a cellular telephone comprising:

a digital processor implemented on a first integrated circuit and configured to provide digital inphase (I) and quadrature (Q) baseband signals;

first and second interface circuits implemented on the first integrated circuit and coupled to the digital processor, each interface circuit configured to receive a respective digital baseband signal and provide an analog baseband signal, wherein each quantized analog baseband signal comprises at least four bits of resolution and is implemented as a differential current signal; and a modulator implemented on a second integrated circuit and operatively coupled to the first and second interface circuits, the modulator configured to receive and modulate the analog baseband signals with a carrier signal to provide a modulated output signal.

30. The transmitter of claim 29, further comprising:

a reference circuit implemented on the second integrated circuit and configured to provide a reference signal, wherein each interface circuit couples to the reference circuit and is further configured to receive the reference signal, and wherein the analog baseband signals are further generated based, in part, on the reference signal.

31. A device comprising:

an interface circuit formed on a first integrated circuit (IC) for generating a differential current signal responsive to a reference signal and to a digital data input; and a circuit element formed on a second IC for generating an output signal on the basis of the differential current signal.

32. The device of claim 31, wherein the device is a transmitter.

33. The device of claim 32, wherein the transmitter is a quadrature transmitter.

34. The device of claim 31, wherein the device is a CDMA telephone.

35. The device of claims 31, 32, or 34, wherein the reference signal is generated by a reference circuit on the second IC.

36. The device of claims 31, 32, or 34, further comprising a reference circuit for generating the reference signal.

37. The device of claims 31, 32, or 34, further comprising at least one capacitor coupled between the differential current signal.

38. The device of claims 31, 32, or 34, wherein the digital data input is at least one of an analog inphase (I) and a quadrature (Q) baseband signal.

39. The device of claims 31, 32, or 34, wherein the reference signal is a voltage reference signal.

40. The device of claim 39, wherein the voltage reference signal is generated on the bas of a bandgap reference voltage.

41. The device of claims 31, 32, or 34, wherein the reference signal is a current generated from a reference voltage and a resistor.

42. The device of claim 41, wherein the output signal is a voltage signal and the resistor is external to the first and second ICs.

43. The device of claim 41, wherein the output signal is a current signal and the resistor is implemented on the second IC.

44. The device of claims 31, 32, or 34, wherein the interface circuit includes a current mirror for generating at least two mirror paths using the reference signal and a switch array for decoding the digital data input and for directing current from selected ones of the mirror paths to generate the differential current signal.

45. The device of claims 31, 32, or 34, wherein the digital data input is at least a four bit digital data input.

46. The device of claims 31, 32, or 34, wherein the digital data input is an oversampled digital data signal.

47. The device of claims 31, 32, or 34, wherein the circuit element is any of a variable gain amplifier (VGA), mixer, and power amplifier (PA) driver.

48. The device of claims 31, 32, or 34, wherein the circuit element is a modulator.

49. The device of claim 48, wherein the modulator includes a pair of current sources coupled to the differential current signal, and a pair of cross-coupled differential amplifiers, each differential amplifier coupled to a respective current source, the differential amplifiers operating to receive a carrier signal and to generate the output signal based, in part, on the carrier signal and the differential current signal.

50. The device of claim 49, wherein each current source in the modulator provides a bias current that is related to the reference signal.

51. The device of claim 48, wherein the modulator performs direct up conversion.

52. A device comprising:

an interface circuit for generating a differential current signal, responsive to a reference signal and to a digital data input and adapted for external capacitive filtering between the differential current signal; and a circuit element for generating an output signal on the basis of the differential current signal.

53. The device of claim 52, wherein the device is a transmitter.

54. The device of claim 53, wherein the transmitter is a quadrature transmitter.

55. The device of claim 52, wherein the device is a CDMA telephone.

56. The device of claims 52, 53, or 55, wherein the digital data input is at least one of an analog inphase (I) and a quadrature (Q) baseband signal.

57. The device of claims 52, 53, or 55, wherein die interface circuit includes a cement mirror for generating at least two mirror paths using the reference signal and a switch army for decoding the digital data input and for directing current from selected ones of the mirror paths to generate the differential current signal.

58. The device of claims 52, 53, or 55, wherein the circuit element is any of a variable gain amplifier (VGA), mixer, and power amplifier (PA) driver.

59. The device of claims 52, 53, or 55, wherein the circuit element is a modulator.

60. The device of claim 54, wherein the modulator includes a pair of current sources coupled to the differential current signal, and a pair of cross-coupled differential amplifiers, each differential amplifier coupled to a respective current source, the differential amplifiers operating to receive a carrier signal and to generate the output signal based, in part, on the carrier signal and the differential current signal.

61. The device of claim 60, wherein each current source in the modulator provides a bias current that is related to the reference signal.

62. The device of claim 60, wherein the modulator performs direct up conversion.

63. An analog integrated circuit (IC) adapted for use in a transmit signal path of a communication device, and responsive to an input differential current signal generated externally as a function of a reference signal and a digital data input, the analog IC comprising: a reference circuit for generating the reference signal; and a circuit element for generating an output signal on the basis of the differential current signal.

64. The analog integrated circuit of claim 63, wherein the reference signal is a voltage reference signal.

65. The analog integrated circuit of claim 64, wherein the voltage reference signal is generated on the basis of a bandgap reference voltage.

66. The analog integrated circuit of claim 63, wherein the reference signal is a current generated from a reference voltage and a resistor.

67. The analog integrated circuit of claim 66, wherein the output signal is a voltage signal and the resistor is external to the analog integrated circuit.

68. The analog integrated circuit of claim 66, wherein the output signal is a current signal and the resistor is implemented on the analog integrated circuit.

69. The analog integrated circuit of claim 63, wherein the circuit element is any of a variable gain amplifier (VGA), mixer, and power amplifier (PA) driver.

70. The analog integrated circuit of claim 63, wherein the circuit element is a modulator.

71. The analog integrated circuit of claim 70, wherein the modulator includes a pair of current sources coupled to the differential current signal, and a pair of cross-coupled differential amplifiers, each differential amplifier coupled to a respective current source, the differential amplifiers operating to receive a carrier signal and to generate the output signal based, in part, on the carrier signal and the differential current signal.

72. The analog integrated circuit of claim 71, wherein each current source in the modulator provides a bias current that is related to the reference signal.

73. The analog integrated circuit of claim 70, wherein the modulator performs direct up conversion.

74. An integrated circuit (IC) comprising:

a digital processor generating a digital data input; and at least one interface circuit responsive to a reference signal for generating a differential current signal responsive to a reference signal and to the digital data input.

75. The integrated circuit of claim 74, wherein the at least one interface circuit includes a current mirror for generating at least two mirror paths using the reference signal and a switch array for decoding the digital data input and for directing current from selected ones of the mirror paths to generate the differential current signal.

76. The integrated circuit of claim 75, wherein the digital data input is at least a four bit digital data input.

77. The integrated circuit of claim 76, wherein the digital data input is an oversampled digital data signal.

78. A method comprising:

generating a reference signal;

providing the reference signal to a first circuit;

receiving a digital data input at the first circuit;

generating a differential current signal in the first circuit based, in part, on the digital data input and the reference signal;

providing the differential current signal from the first circuit to a second circuit;

receiving the differential current signal at the second circuit; and generating an output signal from a circuit element in the second circuit, the output signal being based at least in part on the differential current signal.

79. The method of claim 78, wherein the reference signal is a current generated from a reference voltage.

80. The method of claim 78, further comprising filtering the differential current signal.

81. The method of claim 78, further comprising providing a signal related to the reference signal to the circuit element, wherein the output signal is further generated based, in part, on the signal related to the reference signal.

82. A system comprising:

means, formed on a first integrated circuit (IC), for generating a differential current signal responsive to a reference signal and to a digital data input; and means, formed on a second IC, for generating an output signal on the basis of the differential current signal.

83. A system comprising:

means for generating a differential current signal, responsive to a reference signal and to a digital data input and adapted for external capacitive filtering between the differential current signal; and means for generating an output signal on the basis of the differential current signal.

84. An analog integrated circuit (IC) adapted for use in a transmit signal path of a communication device, and responsive to an input differential current signal generated externally as a function of a reference signal and a digital data input, the analog IC comprising:

means for generating the reference signal; and means for generating an output signal on the basis of the differential signal.

85. An integrated circuit (IC) comprising:

means for generating a digital data input; and at least one interface circuit means responsive to a reference signal for generating a differential current signal responsive to a reference signal and to the digital data input.

* * * * *

UNITED STATES PATENT AND TRADEMARK OFFICE

CERTIFICATE OF CORRECTION

PATENT NO. : 6,615,027 B1
DATED : September 2, 2003
INVENTOR(S) : Sahota et al.

It is certified that error appears in the above-identified patent and that said Letters Patent is hereby corrected as shown below:

Column 14,
Line 66, change "bas" to -- basis --.

Column 15,
Line 54, change "die" to -- the --.
Line 55, change "cement" to -- current --.
Line 57, change "army" to -- array --.

Signed and Sealed this

Twenty-eighth Day of October, 2003

JAMES E. ROGAN
*Director of the United States Patent and Trademark Office*